VARIABLE RATE TELEMETRY SYSTEMS

Filed June 9, 1964

INVENTORS
DANIEL D. McRAE,
EDWARD B. GLOVER,
LEON B. WILLIAMSON
& SINCLAIR A. FREDERICK

BY Hurvitz & Rose
ATTORNEYS

3,426,327
VARIABLE RATE TELEMETRY SYSTEMS

Daniel D. McRae, Melbourne, Edward B. Glover, Melbourne Beach, Leon B. Williamson, Palm City, and Sinclair A. Frederick, Melbourne Beach, Fla., assignors to Radiation Incorporated, Melbourne, Fla., a corporation of Florida Filed June 9, 1964, Ser. No. 373,688
U.S. Cl. 340—172 6 Claims
Int. Cl. H04q 9/02

ABSTRACT OF THE DISCLOSURE

Selection of only non-redundant data for transmission as a means of reducing redundancy in a data transmission system is achieved by deriving data in the form of periodic samples of an analog waveform, comparing the magnitudes of the samples to the magnitudes of respective time-displaced points on a piecewise linear approximation of the waveform, storing the waveform samples, and selection for transmission to a receiving station only that stored sample immediately preceding a sample exceeding a predetermined deviation from the respective point on the piecewise linear approximation, each selectively transmitted sample having its proper position in time relative to the other selectively transmitted samples.

Figure 1:
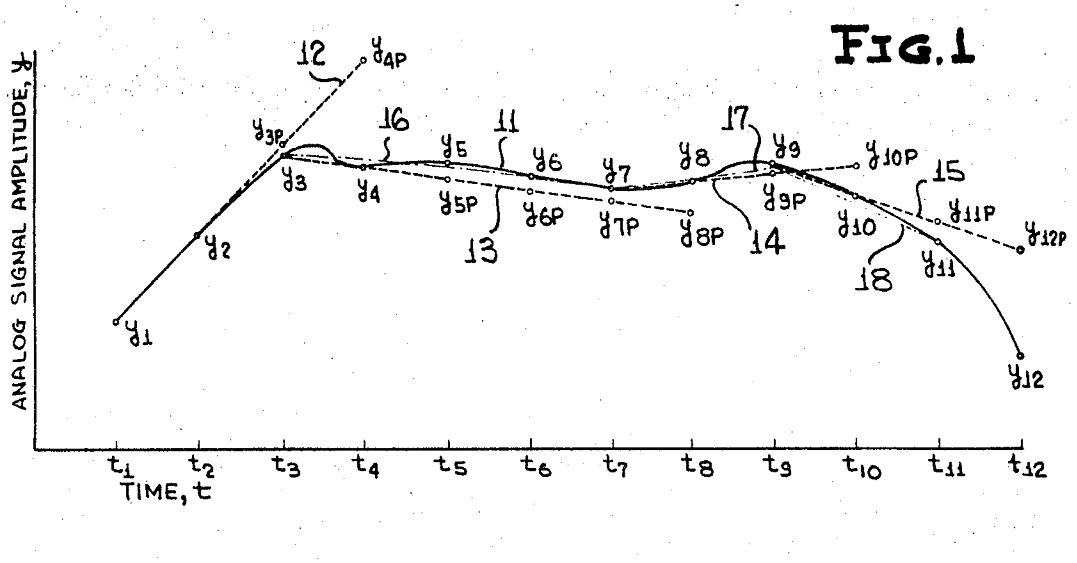

The present invention relates generally to telemetry systems and more particularly to variable transmission rate telemetry systems wherein data is transmitted only when the event being monitored differs from the value of a predetermined waveshape by a predetermined amount.

The requirement for effective system wherein redundancy in data transmitted from missiles is considerably reduced has received considerable attention. Since missile and space craft data handling systems are generating larger and larger amounts of data, as the size and complexity of the missiles and space craft increase, the telemetry links between these devices and the ground receiver are requiring unreasonably wide bandwidths. Wide bandwidth is necessary because every monitored parameter is sampled at a constant rate that is at least twice the highest frequency of any parameter. As the number of monitored channels increases, the sampling rate must be increased to satisfy the above requirement. Increasing the data sampling rate requires wider band width links so that a compromise between bandwidth and the amount of information transmitted must be reached.

The present invention affords relief from this dilemma by relying upon the fact that the monitored information is, primarily, of a low frequency nature. In consequence, according to the present invention, data is transmitted at a rate determined by the spectrum of the monitored event. If the monitored data is following a predetermined law of variation, within bounds, no signals are transmitted until the data exceeds those bounds. Thereby, redundant data, i.e. data having no significant information content outside the bounds known at the receiver from the predetermined variation law, is not transmitted and data transmission efficiency is considerably increased. At the receiver, the data points are collected and the parameter at the transmitter is ascertained by interpolating, according to the known variation law, between adjacent received points.

In the system of the present invention, the known law of variation is assumed to be a linear function of time. By transmitting data points only when the monitored parameter differs from a particular linear function, the receiver can reconstitute the monitored parameter by linearly interpolating between the transmitted points.

According to one embodiment of the invention, the decision to transmit a sampled data point $y_n$, occurring at $t_n$, is made by erecting a straight line between the first and second time sampled points $y_1$, $y_2$ of an interval in which the function is approximately linear. When the sample value $y_{n+1}$ differs from the straight line intercepting $y_1$ and $y_2$ by a predetermined amount, $\delta_{max}$, $y_n$ is considered as a non-redundant point, hence is transmitted. $y_1$ and $y_n$ are applied to the receiver which now assumes that a straight line having a slope $$\frac{y_1-y_n}{t_n-t_1}=\frac{\Delta y_{1-n}}{\Delta t_{1-n}}$$

exists between the sampled points $y_1$ and $y_n$. The assumption is correct assuming sufficient sampling rate.

It is, accordingly, an object of the present invention to provide a variable transmission rate telemetry system wherein only non-redundant data is transmitted.

Another object of the invention is to provide a telemetry system wherein data is transmitted only when it differs from a known law of variation by a predetermined amount.

A further object of the invention is to provide a telemetry system wherein data is transmitted only when the value of an event being monitored differs from a linear time function by a predetermined value.

A further object of the invention is to provide a telemetry system wherein data is transmitted only when the value of an event being monitored differs from a straight line between a pair of sampled data points by a predetermined value.

An additional object of the invention is to provide a telemetry system that transmits maximum information by relying only upon the utilization of non-redundant data.

Figure 2:
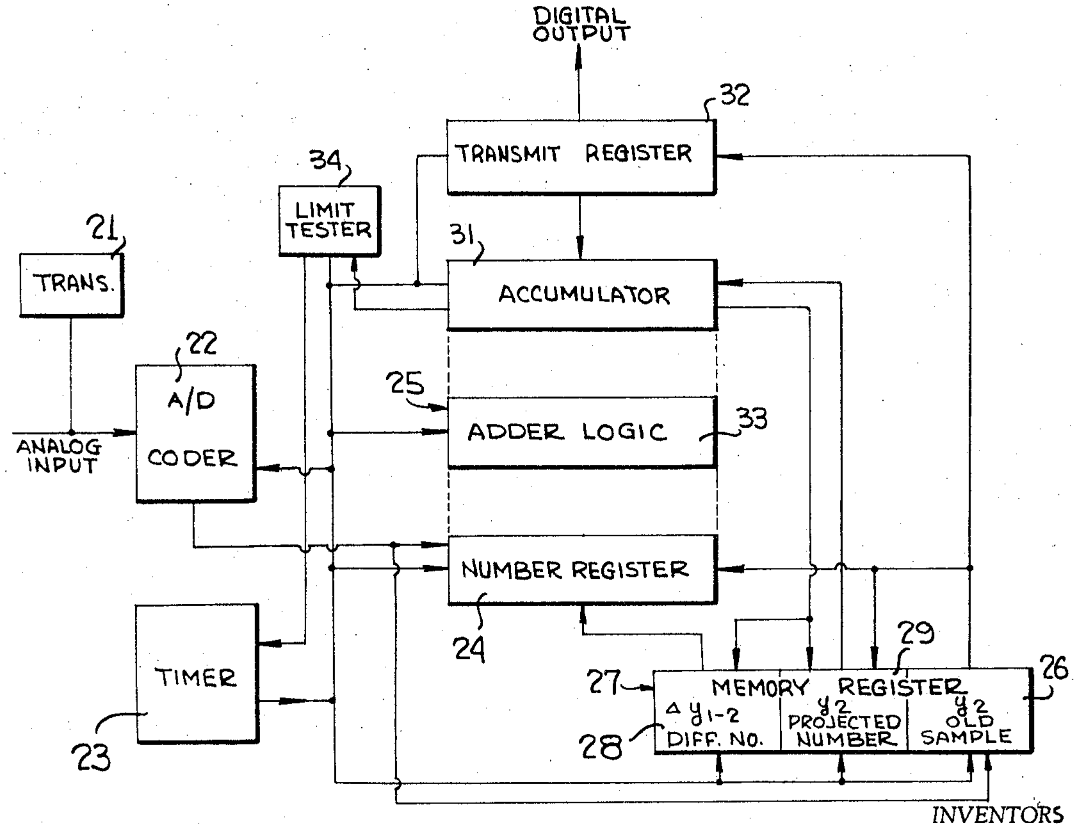

The above and still further objects, features and advantages of the present invention will become apparent upon consideration of the following detailed description of one specific embodiment thereof, especially when taken in conjunction with the accompanying drawings, wherein:

FIGURE 1 is a graph to aid in describing a preferred embodiment of the invention; and FIGURE 2 is a block diagram of the embodiment operating in accordance with FIGURE 1.

Reference is now made to FIGURE 1 of the drawing wherein the solid line 11 indicates the amplitude variations of an analog signal with respect to time. This figure is utilized to explain the manner in which a preferred embodiment of the invention functions to derive information only when the analog signal deviates from a straight line by a predetermined value, $\delta_{max}$. Each of the times $t_1, t_2 \ldots t_k$ is separated from each other by a common factor so that $\Delta t=t_2-t_1=t_3-t_2$ etc.

At times $t_1$ and $t_2$, function 11 has the values $y_1$ and $y_2$, respectively. The difference between $y_1$ and $y_2$, $\Delta y_{1-2}$, is computed to determine the slope of function 11 between these points. To determine the predicted function value at $t_3$, i.e. an extrapolation of the straight line between $t_1$ and $t_2$ to $t_3$, $y_2$ is added to $\Delta y_{1-2}$ to give the point $y_{3p}$ lying along dashed line 12. This is equivalent to computing $y_{3p}$ according to the standard straight line equation $$y=\frac{\Delta y_{1-2}}{\Delta t_{1-2}}t+y_1$$

Once $y_{3p}$ has been computed, it is compared with the actual value, $y_3$, of function 11 at $t_3$. Since the difference between $y_{3p}$ and $y_3$, $\delta$, is quite small, less than the assumed value of $\delta_{max}$, the extrapolation process is continued along line 12. At time $t_4$, the value of $y_{4p}$ is computed as $\Delta y_{1-2}+y_{3p}$ which is equivalent to adding the predicted value at $t_3$ to the product of the straight line slope and a unit time measure. When the values of $y_{4p}$ and $y_4$ are compared, it is found that $\delta$ between them exceeds $\delta_{max}$. Thus, an indication is provided that the straight line 12 extrapolated from points $y_1$ and $y_2$ differs from the actual value of function 11 at $t_4$ by an amount in excess of the maximum tolerable system error. In consequence, to obtain information within the limits of $\delta_{max}$, it is necessary to identify the value of function 11 at $t_3$ as non-redundant.

Since $y_{4p}$ differs from $y_4$ by an amount greater than $\delta_{max}$, it can no longer be assumed that straight line 12 is an approximation of function 11 and a new straight line 13 approximating function 11 must be determined. The starting point of line 13 is known to be at $y_3$ and its slope can be determined by computing the difference between $y_3$ and $y_4$, $\Delta y_{3-4}$. Thus each of the predicted points, $y_{5p}$, $y_{6p}$, $y_{7p}$ and $y_{8p}$, along curve 13 can now be determined by extrapolation in the manner indicated supra for points $y_{3p}$ and $y_{4p}$. Comparisons with each predicted point along line 13 are made with the corresponding points along curve 11. For the points at $t_5$, $t_6$, $t_7$ the differences between the values of line 13 and function 11 are less than $\delta_{max}$. At $t_8$, the difference between the predicted and actual functions again exceeds $\delta_{max}$ so $y_7$ is identified as non-redundant and a new predictor line 14 of slope $$\frac{y_7-y_8}{\Delta t}$$

is initiated at $y_7$. Line 14 continues until $f_1$ when $\delta$ exceeds $\delta_{max}$, the value of $t_9$ is identified as non-redundant and a new predictor line 15 is extrapolated. As time progresses new predictor functions are generated and compared with the actual values of wave 11 in the manner identical to that indicated for points $y_1$-$y_{10}$.

To approximate function 11 from the differences between wave 11 and predictor lines 12, 13, 14, only the values of the wave at the sampling times immediately before the sampling time when $\delta \gtrsim \delta_{max}$ are taken. By linearly interpolating between these values, they alone can be utilized to determine function 11 to a very close approximation. In FIGURE 1, straight lines 16, 17, 18 between the points $y_3$, $y_7$, $y_9$ and $y_{11}$ approximate, to an extent of 2 $\delta_{max}$ function 11 in the interval $t_{11}-t_3$. Thus, by utilizing points $y_3$, $y_7$, $y_9$ and $y_{11}$, at the ends of lines 16, 17 and 18, function 11 can be very closely approximated with a minimum amount of information.

According to one embodiment of the present invention the technique of minimum, non-redundant information sampling illustrated by FIGURE 1 is utilized in a telemetry link. Only the sampled points $y_3$, $y_7$, $y_9$ and $y_{11}$ are transmitted from an analyzing apparatus at an information source at times $t_3$, $t_7$, $t_9$, $t_{11}$, respectively. At the receiver, function 11 is regenerated, approximately, by linearly interpolating between the received, sampled points to derive the function defined by straight lines 16–18. The manner in which the approximate function is generated at the receiver in response to the received points is a well known technique and forms no part of this invention.

A digital embodiment of the apparatus utilized at the transmitter to derive the points $y_3$, $y_7$, $y_9$, $y_{11}$ is illustrated in FIGURE 2. An analog input signal, such as is generated by strain gage accelerometer 21 on a missile, is supplied to analog to digital converter 22. Converter 22 is controlled by timer 23 so that a parallel, multi-bit digital signal indicative of the instantaneous value of the analog signal is derived from the converter at each of the equally spaced time intervals $t_1$, $t_2$, $t_3$, etc.

The parallel signal deriving from coder or converter 22 is applied to number register 24 of arithmetic unit 25 and to old sample segment 26 of memory register 27 under the control of pulses from timer 23. Memory register also includes a pair of other segments 28 and 29, denominated difference number and projected number, which are responsive to the signal stored in accumulator register 31 of arithmetic unit 25 under the control of signals from timer 23.

To perform the operations of addition or subtraction, signals are supplied to accumulator 31 from projected number register 29 or transmit register 32 under the control of programing signals from timer 23. The number in accumulator 31 is algebracially combined with the number fed to number register 24 from memory register segment 26 or segment 28 via adder logic circuitry 33. If an addition operation is performed, logic unit 33 is controlled by a series of pulses from timer 23 in such a manner as to advance accumulator 31 by an amount indicative of the number stored in register 24. When substraction occurs, adder unit 33 is adjusted by pulses from timer 23 in a manner whereby the count in accumulator 31 is decremented by the count in register 24.

To determine if the count stored by output or transmit register is greater than $\delta_{max}$ after a computation cycle has been completed, limit tester 34 is provided. Tester 34 is coupled by a control signal from timer 23 to the highest orders of accumulator 31. Tester 34 ascertains if a zero or a one appears in each sampled place of accumulator 31, the number of such places being determined by the desired system accuracy, i.e. by the maximum acceptable value of $\delta_{max}$.

If each sampled place of accumulator 31 has a zero or a one in it, $\delta$ is less than $\delta_{max}$ and the arithmetic unit is recycled through a new computation cycle having the same a priori information as the previous cycle. Recycling is under the direction of a control pulse supplied by limit tester 34 to timer 23.

When, however, $\delta$ is equal to or greater than $\delta_{max}$, a binary one appears in at least one place of accumulator 31 sampled by limit tester 34. Under such an occurrence, timer 23 completes a full cycle of operation whereby the contents of register 32 are read out to a transmitter and new signals are loaded into segments 26, 28 and 29 of memory register 27. Into difference number segment 28 is loaded a signal indicative of the difference between the sampled function value at the time when $\delta \geqq \delta_{max}$ and the the immediately preceding sampled function value, e.g. $y_4-y_3=\Delta y_{3-4}$, in FIG. 1. Both old sample segment 26 and projected sample segment 29 are, at the same time, loaded with signals indicative of the function value when $\delta \geqq \delta_{max}$, in the example considered above, $y_4$. The manner in which the separate parts of memory register 27 are so loaded will be more clearly seen from the following example wherein it is assumed that the input to coder 22 follows wave 11 and the point in time is between $t_4$ and $t_5$ immediately following readout of $y_3$ from register 32 to the transmitter.

The first output, $S_1$, from timer 23 (after register 32 readout) causes accumulator 31, number register 24 and transmit register 32 to be cleared so they are ready to receive new information. The following output of sequencer 23, $S_2$, results in transferring the contents of register segments 28 and 29 to number register 24 and accumulator 31, respectively. Thereby, register 24 is loaded with $\Delta y_{3-4}$ and accumulator 31 with $y_4$. At the time when $S_3$ is derived from timer 23, the contents of register 24 are added to the contents of accumulator 31, whereby the accumulator is set to $y_4+\Delta y_{3-4}=y_{5p}$. Simultaneously the bits stored in register segment 26 indicative of $y_4$ are transferred to transmit register 32.

$S_4$ is then generated by timer 23 to clear register 24 as well as register segments 26 and 29. The fifth sequencing pulse, $S_5$, is thereafter derived from timer 23 to non-destructively transfer the signal indicative of $y_{5p}$ from accumualtor 31 to projected number segment 29 of register 27. When $S_5$ is generated, time has advanced to the point where the code or digital number deriving from coder 22 is indicative of $y_5$. The output of coder 22 is now sampled under the control of sequence pulse $S_5$, and the sampled value $y_5$ is applied in parallel to number register 24 and old sample register 26.

In response to the next pulse, $S_6$, from timer 23, the contents of number register 24, $y_5$, are subtracted from the number $y_{5p}$, stored in accumulator 31. The resultant stored in accumulator 31 is indicative of $\delta = y_{5p} - y_5$. When the $S_7$ output is produced by sequencer or timer 23, the most significant places of accumulator 31 are examined by limit tested 34. Since $y_5 - y_{5p}$ is less than $\delta_{max}$, each examined place of accumulator 31 is a binary ONE, and a control pulse is derived from tester 34 whereby timing pulses $S_8$–$S_{11}$ from sequencer 23 are not applied to any of the registers or arithmetic circuits. In consequence, difference number and projected number segments 28 and 29 of register 27 store signals indicative of $\Delta y_{3-4}$ and $y_{5p}$ when timer 23 returns to $S_1$ and a new computation and sampling cycle is initiated. The same sequence indicated supra is followed at times $t_6$ and $t_7$ for which $\delta < \delta_{max}$.

At $t_8$, a binary one does appear in one of the stages of accumulator 31 sampled at $S_7$ by limit tester 34 since $\delta > \delta_{max}$. In consequence, the $S_8$–$S_{11}$ outputs of timer 23 are sequentially applied to the system. In response to the $S_8$ output of timer 23, accumulator 31, number register 24, difference number and projected number register segments 28 and 29 are cleared whereby information is stored only in old sample memory segment 26 and transmit register 32, the former storing $y_8$ and the latter $y_7$. When $S_9$ is produced by timer 23, the $y_8$ value stored in old sample register 26 is transferred in parallel to number register 24 and projected number register 29. Simultaneously, the $y_7$ code in register 32 is transferred into accumulator 31.

In response to the $S_{10}$ output of sequencer 23, the $y_8$ contents of register 24 decrement the $y_7$ signal in accumulator 31 so the latter is left storing a value indicative of $\Delta y_{8-7}$, the slope of straight line 17. When the last timing pulse, $S_{11}$, is generated by timer 23, a pair of simultaneous events occur. The first is to transfer the $\Delta y_{8-7}$ signal stored in accumulator 31 into difference number register 28. At the same time, the $y_7$ contents stored in transmit register 32 are applied to the transmitter from which a signal is derived indicative of $y_7$. The signal is derived from the transmitter precisely at a time indicative of $t_7$. The timer is then advanced to $S_1$ and a new sample and computation cycle for the interval $t_8$ to $t_9$ is initiated.

It is thus seen that (1) the first number, $y_7$, in the new predictor line 14 is transmitted, (2) register segment 28 stores a quantity $\Delta y_{8-7}$ indicative of the slope of line 14 and (3) register segments 26 and 29 store $y_8$ when the new cycle is begun. In this same manner, only the non-redundant information points $y_9$, $y_{11}$, etc. occurring after $y_7$ are transmitted and the values of function 11 at times $t_8$, $t_{10}$ need not be transmitted.

It should be noted that if more than one input parameter is involved, as in the case of time division multiplex data register segment 26, 28 and 29 of FIG. 2 can be loaded with numbers from a memory that steps in sequence with the multiplexer. Thus, each parameter would have its own numbers for these three register segments. The new values of these numbers would be stored following each set of calculations for each parameter.

We claim:

1. A variable rate telemetry system for transmitting data representative of magnitudes of displaced samples of a time varying signal, comprising means for sampling said signal at time intervals of equal duration, means for storing the values of the samples, means for determining the slope of the line along which successive samples lie as a linear projection of the signal waveform, means for comparing each succeeding sample with a respective point on the linear projection to determine the difference therebetween relative to a predetermined deviation limit, and means for selecting as samples for transmission only the samples immediately preceding those samples exceeding said predetermined deviation limit.

2. The system according to claim 1 wherein said means for determining slope initiates a new slope determination in response to a sample exceeding said predetermined deviation limit.

3. Apparatus for transmitting data obtained from a monitored signal by which to synthesize the waveform of said signal at a remote receiving station, said apparatus comprising means responsive to said signal for projecting therefrom a set of points at predetermined sampling intervals according to a function only roughly approximating the portion of said signal waveform under consideration, and means responsive to the values of said projected points and to respective values of the signal obtained at said sampling intervals for transmitting only those of said signal values bearing a predetermined relationship to signal values exceeding a fixed deviation from the value of the respective projected point.

4. In a system for transmitting data in the form of sampled values of an analog waveform to a receiving station, means for reducing redundancy of the transmitted data by selecting only non-redundant sampled values for transmission; said means comprising means for sampling said waveform at periodic intervals, means for comparing the magnitudes of the waveform samples to the magnitudes of respective time-displaced points on a piecewise linear approximation of said waveform, means for storing the waveform samples, and means for selecting to be transmitted in its proper temporal position only the stored sample immediately preceding a sample that exceeds a predetermined deviation from the respective point on said piecewise linear approximation.

5. In a telemetering system for transmitting information representative of non-redundant sampled values of a signal waveform to a remote receiving point for regeneration of the signal waveform therefrom, the combination comprising means for sampling said signal waveform, means for actuating said sampling means at desired intervals of time to provide sampled values of said waveform at selected points in time, means responsive to the sampled values of said waveform for establishing piecewise linear approximations of said waveform between non-redundant sampled values, means for storing the sampled values of said waveform and the values of its piecewise linear approximation at corresponding points in time, means for comparing the respective values of the samples of said waveform and of the piecewise linear approximation thereof to generate an output representative of the difference therebetween, and means responsive to those of said outputs representative of differences exceeding a predetermined amount for selecting only the stored sampled value immediately preceding each of the last-named outputs for transmission as non-redundant samples of said waveform.

6. In a telemetry system for transmitting data indicative of values of the magnitude of a detected time varying waveform at selected points in time, the combination comprising means for sampling said waveform to obtain measurements of waveform magnitude at the selected points in time, means responsive to at least some of the time-magnitude measurements for establishing a projected variation of said waveform beyond a point in time at which measurements have been obtained, means responsive to the time-magnitude measurements and to said projected variation for determining differences therebetween at corresponding points in time, and means responsive to those of the determined differences exceeding a preselected permissible deviation for transmitting only the measurement of magnitude of said waveform obtained for the immediately preceding respective point in time as a non-redundant data sample of said waveform.

References Cited

UNITED STATES PATENTS

| | | | |
|---|---|---|---|
| 2,886,243 | 5/1959 | Sprague et al. | 235—197 |
| 3,155,821 | 1/1964 | Shain | 235—168 |
| 3,213,444 | 10/1965 | Freeman et al. | 340—347 |
| 3,281,834 | 10/1966 | Caspers et al. | |

OTHER REFERENCES

"Parallel-Analog, Sequential-Digital, and True-Hybrid Computers," Thomas D. Truitt, Data Systems Engineering, pp. 6–12.

DONALD J. YUSKO, *Primary Examiner.*

U.S. Cl. X.R.

340—347; 235—197